United States Patent
Kim et al.

(10) Patent No.: US 9,971,799 B2
(45) Date of Patent: May 15, 2018

(54) STORAGE DEVICE FOR STORING DIRECTORY ENTRIES, DIRECTORY ENTRY LOOKUP APPARATUS AND METHOD, AND STORAGE MEDIUM STORING DIRECTORY ENTRY LOOKUP PROGRAM

(71) Applicant: SAMSUNG ELECTRONICS CO., LTD., Suwon-si, Gyeonggi-do (KR)

(72) Inventors: Jae-Geuk Kim, Hwaseong-si (KR); Chang-Man Lee, Seoul (KR); Chul Lee, Suwon-si (KR); Joo-Young Hwang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 803 days.

(21) Appl. No.: 14/039,009

(22) Filed: Sep. 27, 2013

(65) Prior Publication Data

US 2014/0095458 A1   Apr. 3, 2014

(30) Foreign Application Priority Data

Sep. 28, 2012   (KR) .................. 10-2012-0109379

(51) Int. Cl.
*G06F 17/00* (2006.01)
*G06F 17/30* (2006.01)
(52) U.S. Cl.
CPC .... *G06F 17/3033* (2013.01); *G06F 17/30067* (2013.01); *G06F 17/30109* (2013.01)

(58) Field of Classification Search
CPC ........... G06F 17/30067; G06F 17/3033; G06F 12/1018; G06F 3/0641
See application file for complete search history.

(56) References Cited

U.S. PATENT DOCUMENTS 6,499,032 B1   12/2002   Tikkanen et al.
6,961,739 B2   11/2005   Lee et al.
(Continued)

FOREIGN PATENT DOCUMENTS

JP   06-103140   4/1994
JP   2000-010843   1/2000
(Continued)

*Primary Examiner* — Mariela Reyes
*Assistant Examiner* — Courtney Harmon
(74) *Attorney, Agent, or Firm* — Volentine, Whitt & Francos, PLLC

(57) ABSTRACT

A storage device, a directory entry lookup method for the storage device, and a host running the method can provide a quick directory entry lookup. The host includes an interface for exchanging data with the storage device which stores a multi-level hash table comprising directory entries of each directory, and a file system module receiving a file lookup command designating a target directory and a target filename, calculating a hash value which reflects the target filename and a lookup level, and searching for a directory entry which comprises the target filename in a bucket corresponding to the hash value from among buckets at the lookup level which are included in a multi-level hash table of the target directory. If the search for the directory entry fails, the file system module increases the lookup level and again calculates the hash value and searches for the directory entry for the target filename.

20 Claims, 10 Drawing Sheets

(56) References Cited

U.S. PATENT DOCUMENTS

| | | |
|---|---|---|
| 7,287,046 B2 | 10/2007 | Bulka et al. |
| 7,412,449 B2 | 8/2008 | Both |
| 7,860,908 B2 * | 12/2010 | Kohl ................. G06F 17/30235 707/822 |
| 8,024,383 B2 | 9/2011 | Patel et al. |
| 9,027,984 B2 | 5/2015 | Bates |
| 2003/0177151 A1 * | 9/2003 | Lee et al. ...................... 707/205 |
| 2008/0046445 A1 * | 2/2008 | Passey .............. G06F 17/30091 |
| 2008/0275847 A1 * | 11/2008 | Chellapilla et al. .............. 707/3 |
| 2009/0265400 A1 | 10/2009 | Pudipeddi et al. |
| 2009/0307241 A1 * | 12/2009 | Schimunek ....... G06F 17/30091 |
| 2011/0270852 A1 * | 11/2011 | Watanabe ........... G06F 17/3033 707/754 |

FOREIGN PATENT DOCUMENTS

| | | |
|---|---|---|
| JP | 2000-357115 | 12/2000 |
| KR | 10-0325688 | 6/2001 |
| KR | 10-1072558 | 7/2011 |

* cited by examiner

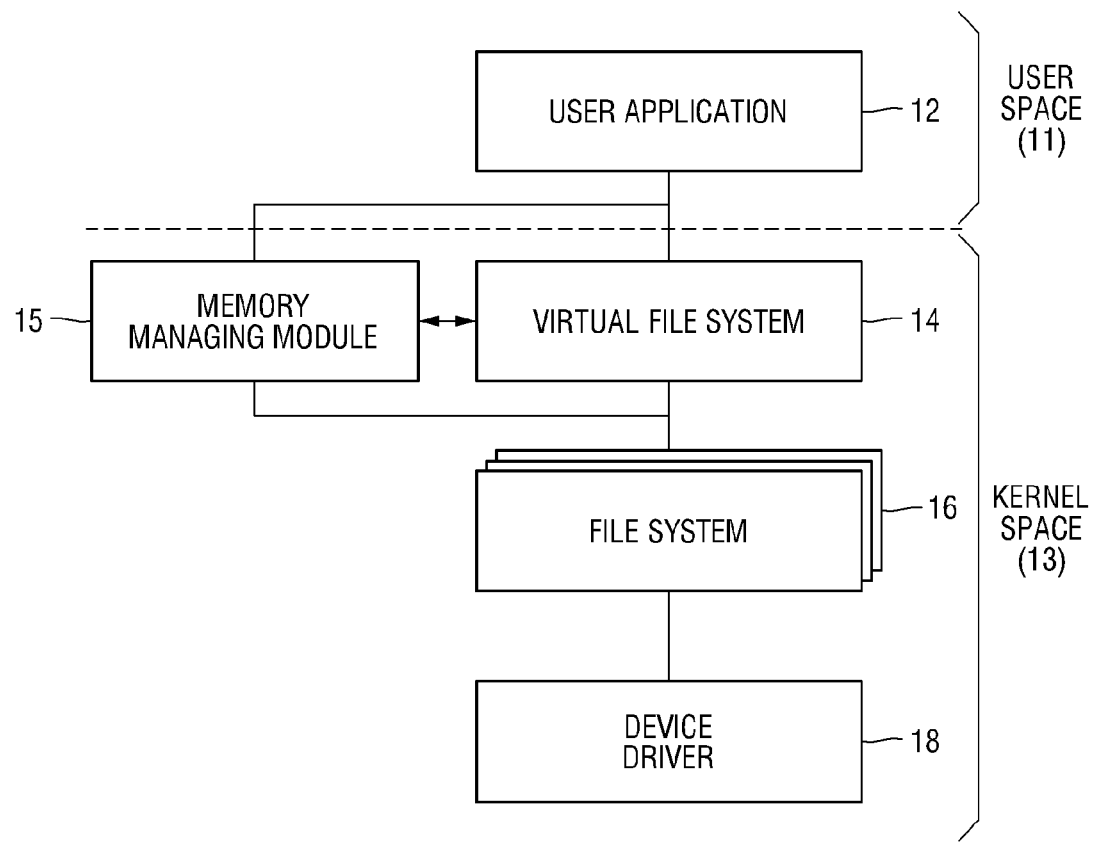
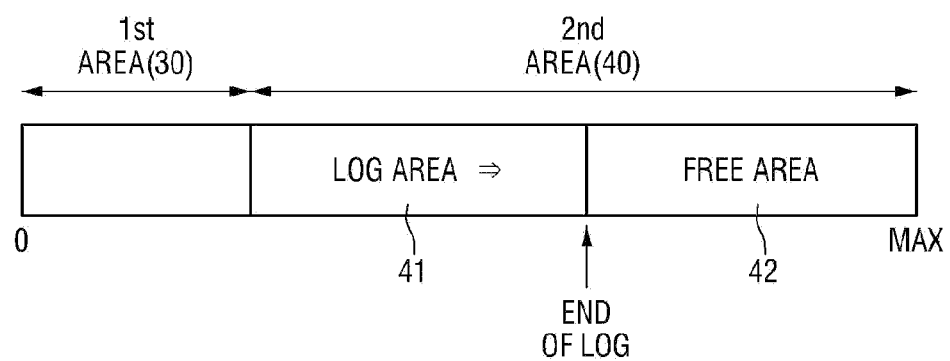

| NODE ID | PHYSICAL ADDRESS |
|---------|------------------|
| N0 | a |
| N1 | b |
| N2 | c |
| ⋮ | ⋮ |

STORAGE DEVICE FOR STORING DIRECTORY ENTRIES, DIRECTORY ENTRY LOOKUP APPARATUS AND METHOD, AND STORAGE MEDIUM STORING DIRECTORY ENTRY LOOKUP PROGRAM

This application claims priority from Korean Patent Application No. 10-2012-0109379 filed on Sep. 28, 2012 in the Korean Intellectual Property Office, the disclosure of which is incorporated herein by reference in its entirety.

BACKGROUND

1. Field of the Invention

The present invention relates to a directory entry (DENTRY) lookup apparatus and method for a storage device, and a data storage medium storing therein a directory entry lookup program, and more particularly, to a directory entry lookup method which can quickly find a directory entry of a target file in the storage device even if a target directory includes many files and which does not need to manage a data structure for quick lookup, and to a directory entry lookup apparatus, and a data storage medium storing therein a directory entry lookup program for performing the method, and further to a storage device configured to store the directory entries.

2. Description of the Related Art

One of the functions provided by a file system is a directory service. The file system manages an index node (inode) for each directory in the same way that it manages an inode for each file. The file system allows each directory entry, which is data about each of the files and subdirectories included in each directory, to be accessed from the inode for that directory in the same way that it allows data included in each file to be accessed from the inode for that file.

A process of quickly finding a file when desired by a user or generating and deleting a file is a major operation of the directory service. In particular, when a directory includes many files, it is very important to find a file quickly.

To find a target file in a directory that includes a plurality of files, a search method using a hash function, a tree-based search method, or the like may be used.

In the search method using the hash function, a target filename is converted into a value using a hash function, and a hash table is searched using an index corresponding to the value in order to find the position of a directory entry corresponding to the target filename. Since the position of a desired directory entry can be immediately found in the hash table, this method is the quickest search method in an ideal situation. However, the costs of processing hash collisions, of managing hash tables, and of managing empty directory entries are incurred.

Meanwhile, a tree-based search method uses a data structure such as a binary search tree which is widely known as a search method that can solve the hash collision problem of the search method using the hash function and reduce the cost of configuring a hash table. In this method, a tree structure is searched using a hash value for a target filename as a key value to find the position of a stored directory entry. The tree-based search method can achieve tolerable performance for a very large number of directory entries. However, since nodes are still generated for empty directory entries, there is wasted storage space occupied by a data structure for lookup of an empty directory.

SUMMARY

Aspects of the present invention provide a host which has a quick directory entry lookup function without requiring a data structure for directory entry lookup.

Aspects of the present invention also provide a host which can solve the problem of waste of storage space that occurs because a maximum filename length is allocated in advance due to uncertainty of a filename length.

Aspects of the present invention also provide a host which uses an indexing structure for storing data included in a file without using an indexing structure for storing directory entries.

Aspects of the present invention also provide a directory entry lookup method which has a quick directory entry lookup function without requiring a data structure for directory entry lookup.

Aspects of the present invention also provide a storage device which stores data files, and further stores directory entries for data files according to a directory entry indexing structure, wherein the directory entry indexing structure is configured as a multi-level hash table.

Aspects of the present invention also provide a non-transitory, or tangible, data storage medium on which a program for executing a directory entry lookup method, which has a quick directory entry lookup function without requiring a data structure for directory entry lookup, is stored.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a host comprising: an interface configured to exchange with a storage device which stores a multi-level hash table comprising directory entries of each directory of files stored in the storage device; and a file system module. The file system module is configured to: receive a file lookup command designating a target directory and a target filename, calculate a hash value which reflects the target filename and a lookup level, and search for a directory entry which comprises the target filename in a bucket corresponding to the hash value from among buckets at the lookup level which are included in a multi-level hash table of the target directory. If/when the search for the directory entry fails, the file system module increases the lookup level and again calculates the hash value and searches for the directory entry which comprises the target filename.

According to another aspect of the present invention, there is provided a directory entry lookup method. The method comprises providing a storage device which stores a multi-level hash table comprising directory entries of each directory of files stored in the storage device, receiving a file lookup command designating a target directory and a target filename, calculating a hash value which reflects the target filename and a lookup level and searching for a directory entry which comprises the target filename in a bucket corresponding to the hash value from among buckets at the lookup level which are included in a multi-level hash table of the target directory which is stored in the storage device, and, if/when the search for the directory entry fails, increasing the lookup level and again calculating the hash value and searching for the directory entry which comprises the target filename.

According to another aspect of the present invention, there is provided a storage device, comprising: a nonvolatile memory device; and a controller for accessing the plurality of memory elements for storing data therein and reading data therefrom. The nonvolatile memory device is configured to store therein a plurality of files of a directory according to a file indexing structure, and is further configured to store therein a plurality of directory entries for the files of the directory, the directory entries being stored according to a directory entry indexing structure. The directory entry indexing structure is configured as a multi-level hash table comprising a having a plurality of levels each having one or more buckets, each bucket further including a plurality of data blocks, each data block in turn having a plurality of directory entry slots. The number of the buckets each level has increases as the level increases. Each of the directory entries is stored in one or more of the directory entry slots. The one of the buckets at a particular level in which one of the directory entries for a particular one of the files is stored is obtained by applying a hash function to a filename of the particular file and dividing a result of the hash function by the number of the buckets that the particular level has.

In some embodiments, the controller may include a buffer comprising volatile memory, wherein the nonvolatile memory device includes a random access area and a sequential area, and wherein the controller is configured to exchange the data between a host and the random access area of the nonvolatile memory device via the buffer.

In some embodiments, the number of buckets at each level A which are included in the multi-level hash table is $M^A$, where M is a natural number equal to or greater than two.

In some embodiments, the multi-level hash table has a tree structure, wherein the tree structure includes: an index node (inode) as a root of the tree structure, the inode being stored in an inode block; one or more direct nodes, each direct node being stored in a corresponding direct node block, and one or more first indirect nodes, each first indirect node being stored in a corresponding first indirect node block. Each direct node includes one or more pointers to one or more of the data blocks, each first indirect nodes includes at least one pointer to one of the direct node blocks, and the inode includes at least one of: pointers to one or more of the data blocks, pointers to one or more of the direct node blocks, and pointers to one or more of the first indirect node blocks.

In some embodiments, each of the nodes has a corresponding node ID, and wherein the nonvolatile memory device is configured to store therein a node address table which maps the node IDs to physical addresses of the nonvolatile memory device.

BRIEF DESCRIPTION OF THE DRAWINGS

The above and other aspects and features of the present invention will become more apparent by describing in detail exemplary embodiments thereof with reference to the attached drawings, in which:

FIG. 3 is a logical module hierarchical diagram of an embodiment of the host shown in FIG. 1;

FIG. 4 is a diagram illustrating the configuration of an embodiment of a storage area of a storage device shown in FIG. 1;

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Figure 1:
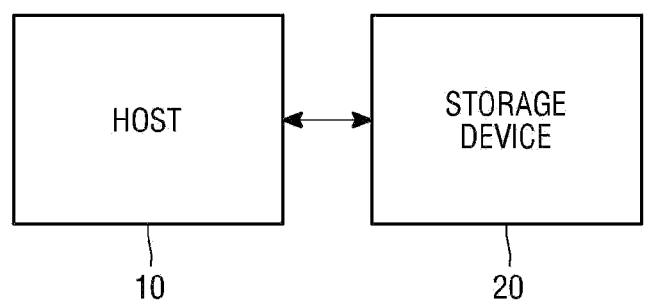
FIG. 1 is a block diagram of an embodiment of a computing system.

Referring to FIG. 1, an embodiment of a computing system 1 includes a host 10 and a storage device 20.

Host 10 may be implemented in a computer, an ultra-mobile PC (UMPC), a workstation, a net-book, a personal digital assistant (PDA), a portable computer, a web tablet, a wireless phone, a mobile phone, a smart phone, an e-book, a portable multimedia player (PMP), a portable game device, a navigation device, a black box, a digital camera, a three-dimensional television, a digital audio recorder, a digital audio player, a digital picture recorder, a digital picture player, a digital video recorder, a digital video player, a device capable of transmitting/receiving information in wireless environments, one of various electronic devices constituting a home network, one of various electronic devices constituting a computer network, one of various electronic devices constituting a telematics network, a radio frequency identification (RFID) device, or one of various components constituting a computing system.

Host 10 and storage device 20 exchange data with each other using a predetermined protocol. For example, host 10 and storage device 20 may communicate with each other using at least one of various interface protocols such as, but not limited to, a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol.

Host 10 controls storage device 20. For example, host 10 may write data to storage device 20 and/or read data from storage device 20.

Storage device 20 may be, but is not limited to, a card storage device (e.g., a static solid disk (SSD), a hard disk drive (HDD) or an eMMC) or a data server.

Storage device 20 includes a plurality of memory elements or cells, for example a plurality of nonvolatile memory elements or cells. Storage device 20 may store therein data arranged in a plurality of files. The files may be arranged in a directory structure and each file may have a filename associated therewith. Storage device 20 may further store therein one or more files or data (e.g., metadata) about one or more of the directories of files stored in storage device 20. The data about the directories may include inode IDs indicating files included in each directory, names of the files, inode IDs indicating subdirectories included in each directory, and names of the subdirectories. Files and subdirectories included in one directory correspond to directory entries.

A directory entry is a structure that includes a filename (or subdirectory name) and an inode ID indicating a file (or subdirectory). That is, a directory inode indicating one directory includes pointers pointing to directory entries which indicate files and subdirectories included in the directory. The directory entries can be accessed from the directory inode through the pointers to find out what files or subdirectories exist in the directory.

Storage device 20 may store a multi-level hash table which includes directory entries of each directory. The multi-level hash table will be described in greater detail later.

Figure 2:
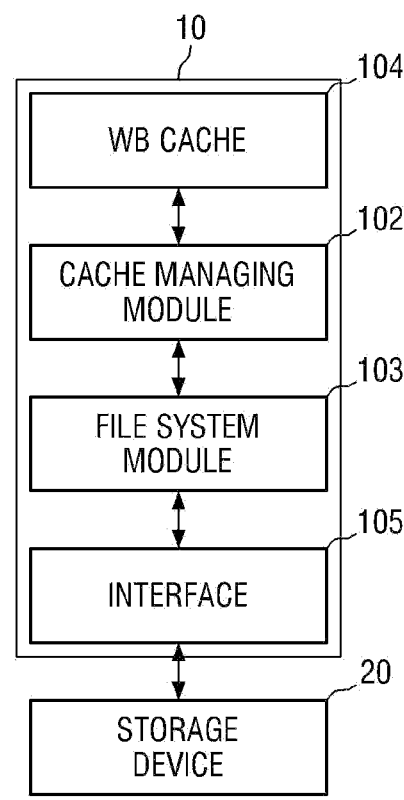
FIG. 2 is a block diagram of an embodiment of a host shown in FIG. 1.

FIG. 2 is a block diagram of an embodiment of host 10 shown in FIG. 1.

Referring to FIG. 2, host 10 may include a write-back (WB) cache 104 which is used to write data to storage device 20, a cache managing module 102 which manages WB cache 104, and an interface 105 which relays data exchanged between a file system module 103 and storage device 20.

Each component shown in FIG. 2 represents, but is not limited to, a software component and/or a hardware component such as a Field Programmable Gate Array (FPGA) or Application Specific Integrated Circuit (ASIC). Each component may advantageously be configured to reside on an addressable storage medium and configured to be executed on or by one or more processors. The functionality provided for in the components may be further separated into additional components or may be combined into fewer components.

Interface 105 may support the protocol used for data exchange between host 10 and storage device 20. Interface 105 may include a connector for a data cable connection and a logic device or circuit for processing data transmission and reception.

File system module 103 receives a file lookup command, which designates a target directory and a target filename, from, e.g., a virtual file system 14 shown in FIG. 3. In response to the file lookup command, file system module 103 may return an inode ID of a file corresponding to the target filename from a directory entry of the file.

File system module 103 may search for an inode of the target directory. By parsing the target directory, file system module 103 finds out subdirectories that should be found in the process of searching for the target directory. For example, if the target directory is "C:\first\second\third\," a subdirectory named "first" should be found in a root directory of a C drive, a subdirectory named "second" should be found in "C:\first\," and then a subdirectory named "third" should be found in "C:\first\second\" to finally access the inode of the target directory.

File system module 103 may use a directory entry lookup method as disclosed herein in order to find the target directory. For ease of description, however, it is assumed in the description to follow that the inode of the target directory has already been found. Based on this assumption, a method of quickly finding the directory entry of the file corresponding to the target filename from among a plurality of files included in the target directory will mainly be described below.

An example embodiment of host 10 will now be described in greater detail with reference to FIG. 3. FIG. 3 is a logical module hierarchical diagram of an embodiment of host 10.

Referring to FIG. 3, host 10 includes a user space 11 and a kernel space 13.

User space 11 is an area in which a user application 12 is executed, and kernel space 13 is an area dedicated to execution of a kernel. A system call provided by the kernel may be used to access kernel space 13 from user space 11.

Kernel space 13 may include one or more file systems 16, the virtual file system 14 which connects an I/O call of user space 11 to an appropriate file system 16, a memory managing module 15 which manages a memory of host 10, and a device driver 18 which provides a hardware control call for controlling the storage device 20. Examples of the file systems 16 may include ext2, ntfs, smbfs, and proc. According to some embodiments of the present invention, one of file systems 16 may be an F2FS file system based on a log-structured file system.

The log-structured file system has been suggested in a server storage system that uses a hard disk drive. Since the hard disk drive is a device that uses a rotary motor, it has seek latency and rotational latency. Therefore, the log-structured file system configures the entire disk as one log and performs a sequential write operation only. That is, when modifying a file, the log-structured file system does not modify data at the original position. Instead, the log-structured file system adds modified data at the end of the log.

Therefore, the log is continuously extended in one direction. When the log cannot be extended any further as a result of continuous data modification and addition, a segment cleaning operation is required. The segment cleaning operation is performed to return some segments (victim segments) included in the log to a free area in which data can be stored. Of blocks included in the victim segments, live blocks including valid data are written back at the end of the log. Thus, data is not lost despite the segment cleaning operation.

Virtual file system 14 enables file systems 16 to operate with each other. For a read/write operation on different file systems 16 of different media, virtual file system 14 enables the use of a standardized system call. For example, a system call, such as open( ), read( ) or write( ), can be used regardless of the type of file systems 16. That is, virtual file system 14 is a virtual layer existing between user space 11 and file systems 16.

Device driver 18 serves as an interface between hardware and a user application (or operating system). Device driver 18 is a program needed for hardware to operate normally on a certain operating system. Device driver 18 may control interface 105.

File system module 103 shown in FIG. 2 may operate as the above-described F2FS file system. In addition, cache managing module 102 shown in FIG. 2 may be a sub module included in virtual file system 14 or memory managing module 15 shown in FIG. 3.

An example of the way the F2FS file system may control storage device 20 will now be described with reference to FIGS. 4 through 12.

Storage device 20 includes a storage medium. Referring to FIG. 4, a storage area of an embodiment of a storage medium of storage device 20 may include a first area 30 and a second area 40. First area 30 is an area that is written in a random access manner, and second area 40 is an area that is written in a sequential access manner. A sequential access write operation refers to writing data to adjacent addresses which increase gradually, and a random access write operation refers to writing data to designated addresses regardless of whether the addresses are adjacent.

As a segment cleaning process progresses, a log area may be divided into multiple parts. Therefore, the sequential access write operation may be limited to a sequential access write within one segment. That is, blocks in one segment may be written sequentially.

The F2FS file system may divide storage device 20 into first area 30 and second area 40 when formatting the storage device 20. However, the present invention is not limited thereto. That is, the F2FS file system may also divide storage area 20 into first area 30 and second area 40 after initially formatting storage device 20. First area 30 is an area in which various information managed system-wide may be stored. The information may include the number of currently allocated files, the number of valid pages, positions, and a bitmap. Second area 40 is a space in which various directory information, data, and file information actually used by a user may be stored.

Storage device 20 may include a buffer utilized for random access. For optimum utilization of the buffer, the area 30 may be stored in a front part of storage device 20, and second area 40 may be stored in a rear part of storage device 20. Here, the front part precedes the rear part in terms of physical address.

If storage device 20 is, for example, an SSD, a buffer may be included in the SSD. The buffer may be, for example, a single layer cell (SLC) memory that can be read or written at high speed. Therefore, the buffer can increase the speed of a random access write operation in a limited space. Hence, a reduction in the I/O speed of storage device 20 due to random access can be prevented using the buffer and by allocating first area 30 in the front part of memory area of storage device 20.

Second area 40 may consist of a log area 41 and a free area 42. In FIG. 4, the log area 41 is one connected area. However, as victim segments included in log area 41 are changed to free area 42 in a segment cleaning process, log area 41 may be divided into two or more parts.

Log area 41 is a data-written area, and free area 42 is a data-writable area. Since second area 40 is written in a sequential access manner, data may be written only to free area 42 located at "the end of log area 41." That is, "the end of log area 41" indicates a position at which data is written. Since log area 41 can be divided into two or more parts as described above, "the end of the log area 41" may also indicate free area 42 located between the parts of log area 41.

When data previously-stored in log area 41 is modified, the modified data is written not to the position of the previously-stored data in log area 41 but to free area 42 located at "the end of the log area 41." Here, the previously-stored data becomes invalid.

As data is newly written or as previously-stored data is modified, the end of log area 41 is gradually moved closer to the end of second area 40, thereby reducing free area 42. Here, segment cleaning is performed. A segment cleaning operation will be described in detail later.

Figure 5:
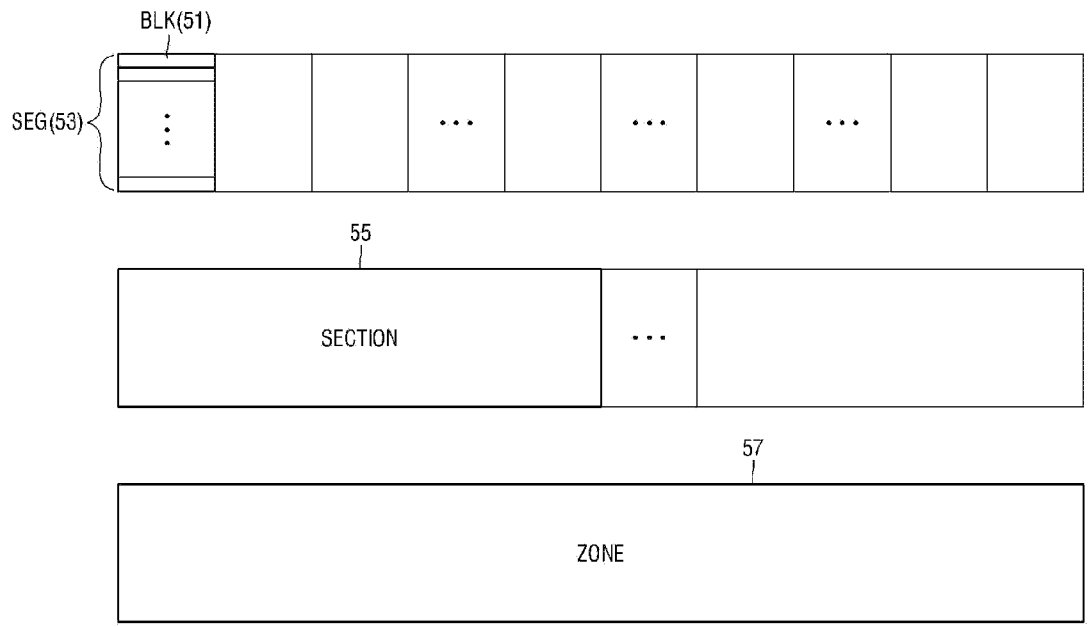
FIG. 5 is a diagram illustrating an example configuration of data stored in an embodiment of the storage device of FIG. 1.

FIG. 5 is a diagram illustrating an example configuration of data stored in an embodiment of storage device 20.

FIG. 5 illustrates: a segment 53 which may include a plurality of blocks 51; a section 55 which may include a plurality of segments 53; and a zone 57 which may include a plurality of sections 55. For example, a block 51 may be 4 Kbytes, and a segment 53 including 512 blocks 51 may be 2 Mbytes. This configuration may be determined at a time when storage device 20 is formatted. However, the present invention is not limited thereto. The size of each section 55 and the size of each zone 57 can be modified when storage device 20 is formatted. The F2FS file system may read or write all data on a 4 Kbyte page-by-4 Kbyte page basis. That is, one page may be stored in each block 51, and a plurality of pages may be stored in each segment 53.

Figure 6:
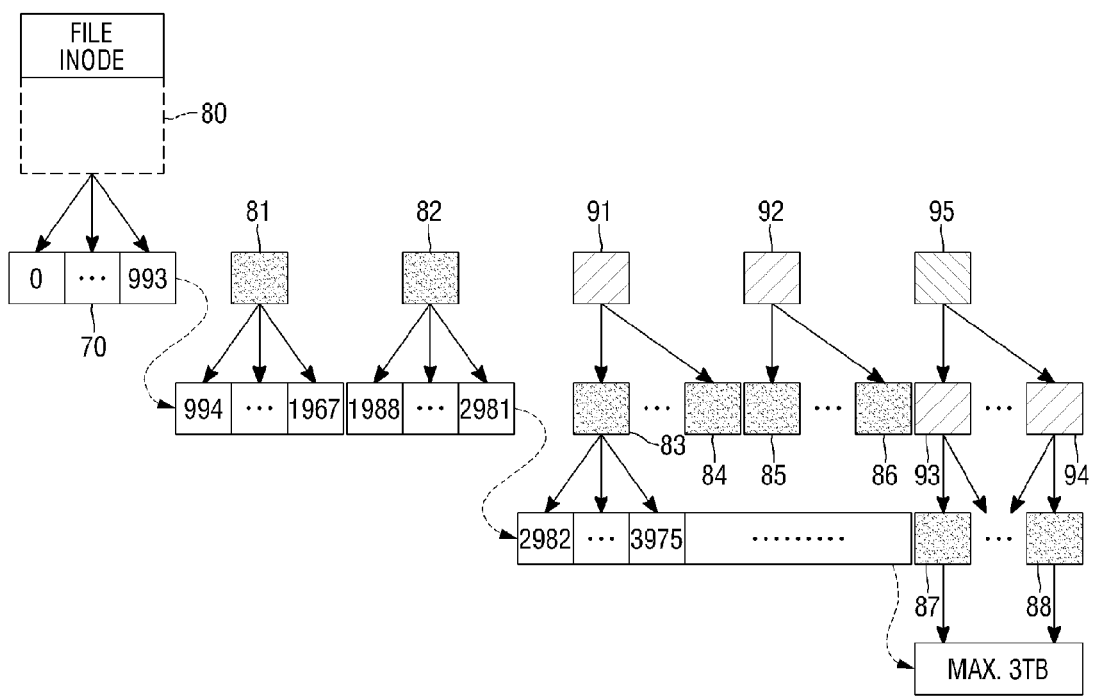
FIG. 6 is a diagram illustrating an example structure of a file stored in an embodiment of the storage device of FIG. 1.

A file stored in storage device 20 may have an indexing structure as shown in FIG. 6. The log-structured file system may configure a file to include a plurality of data and a plurality of nodes associated with the data. Data blocks 70 are blocks that store the data, and node blocks 80, 81 through 88 and 91 through 95 are blocks that store the nodes.

Node blocks 80, 81 through 88 and 91 through 95 may include direct node blocks 81 through 88, indirect node blocks 91 through 95, and an inode block 80. In the F2FS file system, one file has one inode block 80.

Each of direct node blocks 81 through 88 includes an ID of the inode block 80 and a number of data pointers (which directly indicate data blocks 70) equal to the number of the data blocks 70 which are child blocks of the direct node block. Each of the direct node blocks 81 through 88 further stores information about where each data block 70 which is a child block of that direct node block is located in the file corresponding to the inode block 80, that is, offset information for each data block 70.

Each of indirect node blocks 91 through 95 includes pointers which indicate direct node blocks or other indirect node blocks. Indirect node blocks 91 through 95 may include, for example, first indirect node blocks 91 through 94 and a second indirect node block 95. First indirect node blocks 91 through 94 include first node pointers which indicate direct node blocks 83 through 88. Second indirect node block 95 includes second node pointers which indicate first indirect node blocks 93 and 94.

Inode block 80 may include at least one of data pointers, first node pointers which indicate direct node blocks 81 and 82, second node pointers which indicate first indirect node blocks 91 and 92, and a third node pointer which indicates second indirect node block 95. One file may have a maximum of 3 Terabytes, and such a high-volume file may have the following indexing structure. For example, inode block 80 may have 994 data pointers, and the 994 data pointers may indicate 994 data blocks 70, respectively. In addition, inode block 80 may have two first node pointers, and the two first node pointers may indicate direct node blocks 81 and 82, respectively. Inode block 80 may have two second node pointers, and the two second node pointers may indicate first indirect node blocks 91 and 92, respectively. Inode bock 80 may have one third node pointer, and the third node pointer may indicate second indirect node block 95.

Figure 7:
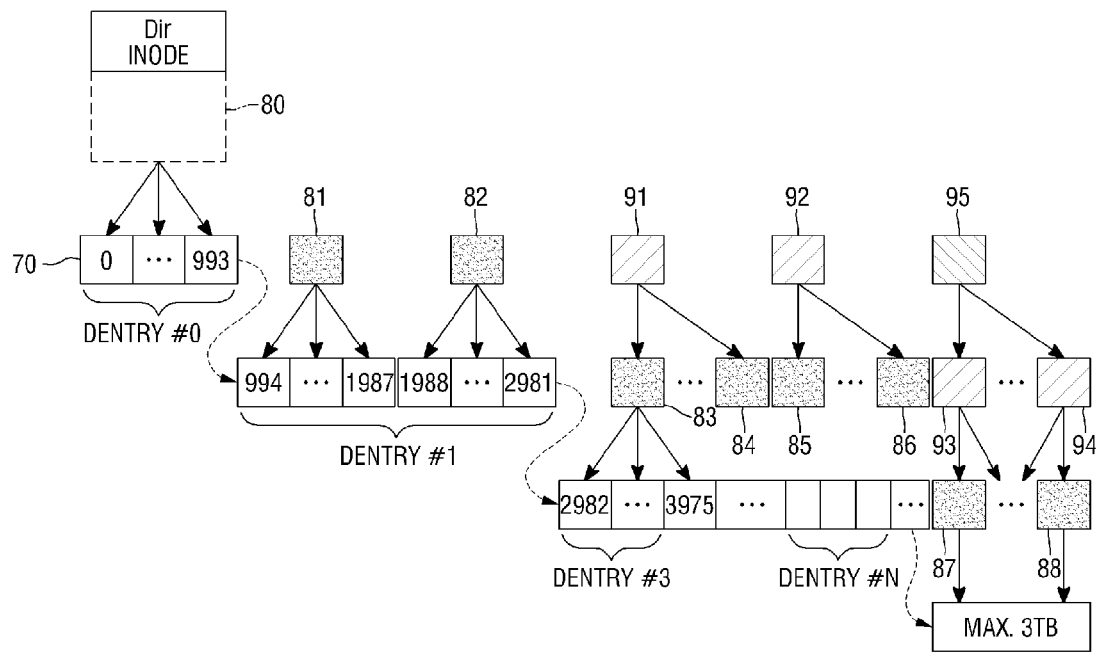
FIG. 7 is a diagram illustrating an example structure of a directory stored in an embodiment of the storage device of claim 1.

A directory stored in storage device 20 may have an indexing structure as shown in FIG. 7. Referring to FIG. 7, an indexing structure for storing directory entries included in a directory may be identical to the indexing structure for storing file data shown in FIG. 6. That is, one directory corresponds to one inode 80, and directory entries accessible through inode 80 are stored in data blocks 70. As in the file indexing structure, some (first data blocks) of data blocks 70 are accessible directly from inode 80, some other ones (second data blocks) are accessible from inode 80 via direct nodes 81 and 82, some other ones (third data blocks) are accessible from inode 80 via first indirect nodes 91 and 92 and direct nodes 83 through 86, sequentially, and some other ones (fourth data blocks) are accessible from inode 80 via a second indirect node 95, first indirect nodes 93 and 94, and direct nodes 87 and 88, sequentially.

The number of data blocks is reduced in the order of the fourth data blocks>the third data blocks>the second data blocks>the first data blocks.

Figure 8:
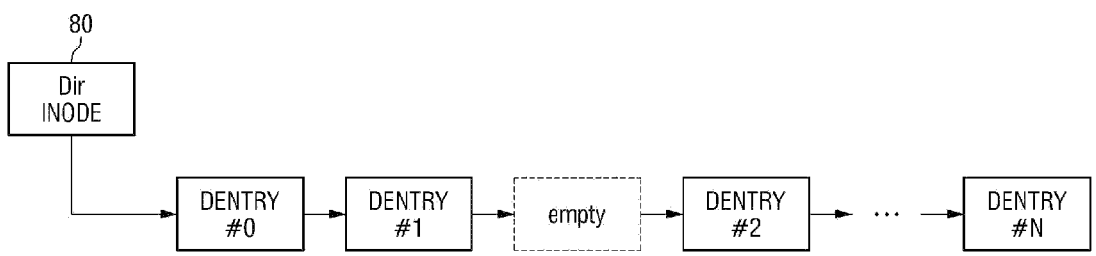
FIG. 8 is a conceptual diagram illustrating the arrangement of directory entries which indicate files and subdirectories included in the example directory of FIG. 7.

FIG. 8 is a conceptual diagram illustrating the arrangement of directory entries from inode 80 of a directory, excluding node blocks. In FIG. 8, an empty space exists between directory entry #1 and directory entry #2. The empty space indicates that invalid data blocks may exist in the log area as a result of deletion or update. If a new file is created in the directory indicated by inode 80, a directory entry corresponding to the new file may be written to the empty space between directory entry #1 and directory entry #2.

The indexing structure (shown in FIG. 7) of a directory stored in the storage device 20 can be used as a multi-level hash table. That is, when directory entries included in a directory are stored in storage device 20, they may be stored at positions determined by a predefined rule, so that they can also be used as a multi-level hash table. Therefore, the directory entries can be looked up quickly. That is, the directory entries included in the directory can be looked up quickly without requiring a data structure for looking up the directory entries. This will be described in greater detail with reference to FIG. 9.

Figure 9:
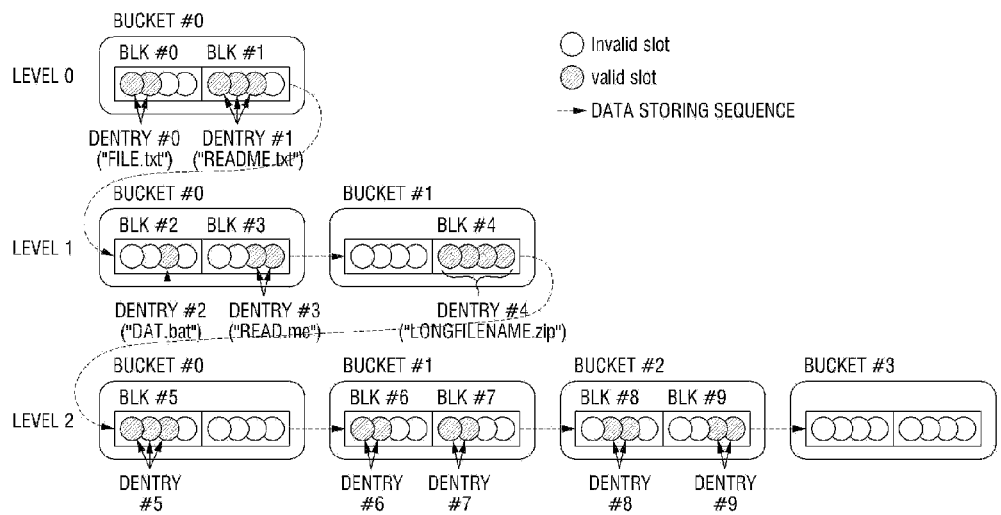
FIG. 9 is a conceptual diagram illustrating a directory entry lookup method according to an embodiment of the present invention.

FIG. 9 is a conceptual diagram illustrating a case where the directory entry indexing structure of FIG. 7 is interpreted as a multi-level hash table.

Referring to FIG. 9, a multi-level hash table includes one or more buckets at each level. As the level increases, the number of buckets also increases. For example, the number of buckets at level A is $M^A$, where M is a predetermined base and a natural number equal to or greater than two. The multi-level hash table should be configured according to the indexing structure of FIG. 7. Therefore, M may be determined to be a value that is proportional to the number of pointers included in each node block.

One bucket includes a predetermined number of blocks. In FIG. 9, one bucket includes two blocks. However, the number of blocks included in one bucket is not limited to two. In some embodiments, each bucket included in the multi-level hash table comprises N blocks, and each block has a predetermined data size, where N is a natural number equal to or greater than two. Since the multi-level hash table should be configured according to the indexing structure of FIG. 7, the number of blocks included in one bucket may be determined to be a value that is proportional to the number of data blocks (e.g., 1018 in FIG. 7) that can be accessed through one node block.

In addition, one block may include a predetermined number of directory entry slots. One directory entry may include one directory entry slot or two or more directory entry slots.

The reason why a directory entry includes one or more directory entry slots is that a filename or a subdirectory name included in the directory entry does not have a fixed length. If a maximum length that a filename or a subdirectory name can have is allocated in advance, since most files or subdirectories have names far shorter than the maximum length, a lot of storage space may be wasted. Therefore, a predetermined number of directory entry slots may be included in one block. Here, a directory entry slot has a fixed data size and has a data size smaller than the maximum length as a storage space for a filename or a subdirectory name. If there is not enough storage space for the filename or the subdirectory name in the directory entry slot, one or more additional directory entry slots may be used. Therefore, the problem of waste of storage space can be solved.

For example, two or more directory entry slots may form one directory entry. In this case, character strings stored in filename storage areas included in the directory entry slots of the directory entry may be connected together to form a filename of a file corresponding to the directory entry.

To allow the indexing structure of a directory stored in the storage device 20 to be used as the multi-level hash table as described above, blocks included in each bucket are stored sequentially by increasing a bucket offset and a level from bucket #0 at level 0. For example, referring to example illustrated in FIG. 9, storage device 20 may sequentially store blocks #0 and #1 at level 0, blocks #2 and #3, an empty block and block #4 at level 1, and block #5, an empty block and blocks #6 through #9 at level 2 according to the indexing structure of FIG. 7.

A process in which the F2FS file system may look up a directory entry with reference to the multi-level hash table will now be described with reference to FIG. 9. The multi-level hash table is identical to the indexing structure which stores directory entries in that it does not include data other than the directory entries. Therefore, the multi-level hash table may be stored according to an indexing structure of a tree structure that uses an inode of a directory corresponding to the multi-level hash table as a root. The inode includes at least one of pointers indicating data blocks, pointers indicating direct node blocks, pointers indicating first indirect node blocks, and pointers indicating second indirect node blocks. Each of the direct node blocks includes one or more pointers indicating the data blocks, each of the first indirect node blocks includes one or more pointers indicating the direct node blocks, each of the second indirect node blocks includes one or more pointers indicating the first indirect node blocks, and the directory entries of the directory corresponding to the multi-level hash table are stored only in the data blocks.

The F2FS file system uses a hash function, which reflects both the target filename and a lookup level, as a hash function for obtaining a hash value. The lookup level denotes a current level in the multi-level hash table. The lookup level starts from zero and increases by one whenever a lookup fails at a corresponding level. The hash function may be as follows.

Bucket offset=hash("target filename")MOD(the number of buckets at lookup level).

That is, an offset of a bucket that should be searched at the lookup level may be determined to be a value obtained by dividing a hash value, which is obtained by applying a hash function to the target filename, by the number of buckets at the lookup level. That is, buckets at each level are accessed using a zero-base offset, and the hash value can be used as the bucket offset.

For example, if "READ.me" is a target filename, bucket #0 is searched at level 0. However, a directory entry that stores "READ.me" as a filename is not found in bucket #0 at level 0. Thus, the lookup level is increased to level 1. Since the bucket offset was determined to be zero at level 1 (hash value of level 1 was calculated to zero), bucket #0 is searched at level 1. Finally, the directory entry that stores "READ.me" as the filename is found in bucket #0 at level 1.

In the hash table of FIG. 9, the number of buckets increases as the level increases. However, since a hash function at a certain level also reflects the increased number of buckets, an offset of a bucket which should be searched at the level can be found within the time of O(1) time complexity. In addition, since the hash table is stored according to the indexing structure of FIG. 7, the number of buckets included in one level may increase as the level increases. Therefore, even if the number (N) of directory entries included in one directory increases, a directory entry can be found within the time of O (log N) time complexity.

FIGS. 10A through 10D are diagrams illustrating example arrangements of blocks stored in embodiments of storage device 20 of FIG. 1.

Figure 10A:
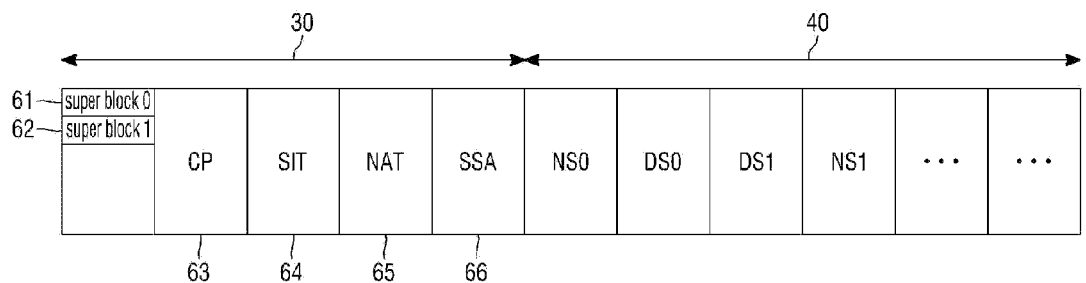
FIGS. 10A through 10D are diagrams illustrating example arrangements of blocks stored in embodiments of the storage device of FIG. 1.

The F2FS file system may configure the storage area of storage device 20 to include a random accessible first area 30 and a sequentially accessible second area 40, as shown in FIG. 10A.

Specifically, first area 30 may include super blocks 61 and 62, a checkpoint (CP) area 63, a segment information table (SIT) 64, a node address table (NAT) 65, and a segment summary area (SSA) 66.

In super blocks 61 and 62, default information of a file system 16 is stored. For example, the size of blocks 51, the number of blocks 51, and a status plug (clean, stable, active, logging, or unknown) of file system 16 may be stored. As shown in the drawing, two super blocks 61 and 62 may be provided, and the same content may be stored in both of the two super blocks 61 and 62. Therefore, when a problem occurs in any of the two super blocks 61 and 62, the other can be used.

CP area 63 stores a checkpoint. CP is a logical break point, and the status until the break point is completely preserved. When an accident (e.g., a shutdown) occurs during the operation of a computing system, file system 16 can recover data using the preserved CP. CP may be generated periodically, at an Umount time, or at a system shutdown time. However, the present invention is not limited thereto.

Figures 11, 12:
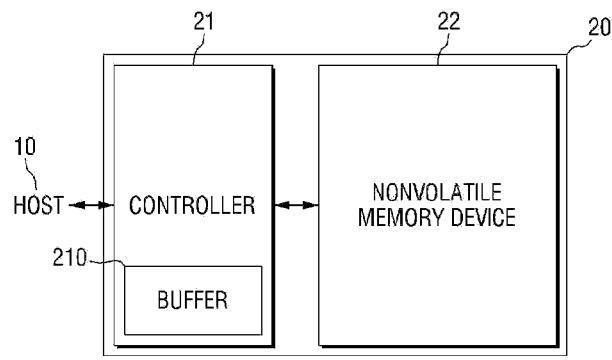
FIG. 11 is a diagram illustrating an embodiment of a node address table (NAT)
FIGS. 12 through 14 are block diagrams of other specific examples of the computing system according to some embodiments of the present invention.

FIG. 11 is a diagram illustrating an embodiment of NAT 65. Referring to FIG. 11, NAT 65 may include a plurality of node IDs respectively corresponding to nodes, and a plurality of physical addresses respectively corresponding to the node IDs. For example, a node block corresponding to node ID N0 may correspond to physical address a, a node block corresponding to node ID N1 may correspond to physical address b, and a node block corresponding to node ID N2 may correspond to physical address c. All nodes (an inode, direct nodes, indirect nodes, etc.) have unique node IDs. In other words, all nodes (an inode, direct nodes, indirect nodes, etc.) may be allocated unique node IDs from NAT 65.

NAT 65 may store a node ID of an inode, node IDs of direct nodes, node IDs of indirect nodes, and the like. A physical address corresponding to each node ID can be updated.

SIT 64 includes the number of live blocks included in each segment and a bitmap indicating whether each block is a live block. Each bit of the bitmap indicates whether a corresponding block is a live block. SIT 64 can be used in a segment cleaning operation. That is, file system module 103 can discover live blocks included in each victim segment by referring to the bitmap included in SIT 64.

SIT 64 can be referred to in order to select victim segments. That is, a victim segment may be selected based on the number or proportion of live blocks relative to the total number of blocks included in a segment.

SSA 66 describes an ID of a parent node to which each block included in each segment of second area 40 belongs.

Each of direct node blocks 81 through 88 has address information of data blocks 70 which are its child blocks in order to access those data blocks 70. On the other hand, each of the indirect node blocks 91 through 95 has an ID list of its child nodes in order to access the child node blocks. Once an ID of a certain node block is identified, a physical address thereof can be identified with reference to NAT 65.

In a log-structured file system, data written to a data block is not overwritten at its original storage position as a different value. Instead, a new data block having updated data is written at the end of a log. In this case, a parent node block of the data block should modify the existing address of the data block. Therefore, to overwrite a data block or write back the data block at the end of the log in a segment cleaning process, information about a parent node of the data block is required. However, it is difficult for each data block or each node block to identify information about its parent node. Therefore, the F2FS file system includes SSA 66 which contains an index used by each data block or each node block to identify an ID of its parent node block. Based on SSA 66, the ID of the parent node block of each data block or each node block can be identified easily.

One segment summary block has information about one segment in second area 40. In addition, the segment summary block consists of a plurality of pieces of summary information, and one piece of summary information corresponds to one data block or one node block.

Referring to FIG. 10A, second area 40 may include data segments DS0 and DS1 and node segments NS0 and NS1 separate from the data segments DS0 and DS1. A plurality of data may be stored in the data segments DS0 and DS1, and a plurality of nodes may be stored in the node segments NS0 and NS1. If data and nodes are stored in different regions, segments can be managed efficiently, and the data can be read more effectively in a shorter time.

In FIG. 10A, first area 30 includes the super blocks 61 and 62, CP area 63, SIT 64, the NAT 65, and SSA 66 arranged sequentially. However, the present invention is not limited thereto. For example, the position of SIT 64 and the position of NAT 65 can be reversed, and the position of NAT 65 and the position of SSA 66 can be reversed.

Figure 10B:
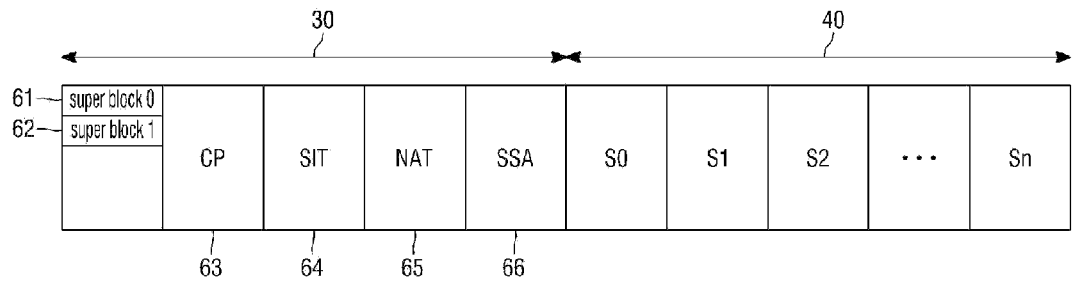

The F2FS file system can also configure the storage area of the storage device 20 as shown in FIG. 10B. Referring to FIG. 10B, in another example of storage device 20 of a computing system, second area 40 may include a plurality of segments S1 through Sn which are separate from each other, where n is a natural number. While data segments and node segments are managed separately in FIG. 10A, data and nodes can be stored together in each of the segments S1 through Sn in FIG. 10B.

Figure 10C:
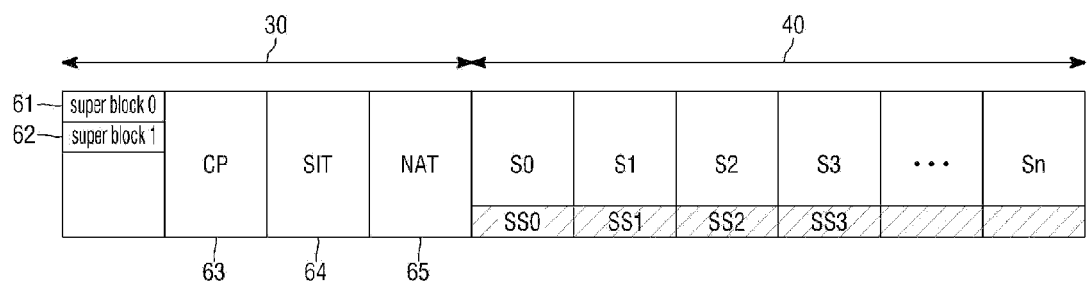

The F2FS file system can also configure the storage area of storage device 20 as shown in FIG. 10C. Referring to FIG. 10C, first area 30 does not include SSA 66 (see FIG. 10A). That is, first area 30 includes super blocks 61 and 62, CP area 62, SIT 64, and NAT 65. Therefore, segment summary information may be stored in second area 40. Specifically, second area 40 includes a plurality of segments S0 through Sn, and each of the segments S0 through Sn is divided into a plurality of blocks. The segment summary information may be stored in at least one block SS0 through SSn of each of the segments S0 through Sn.

Figure 10D:
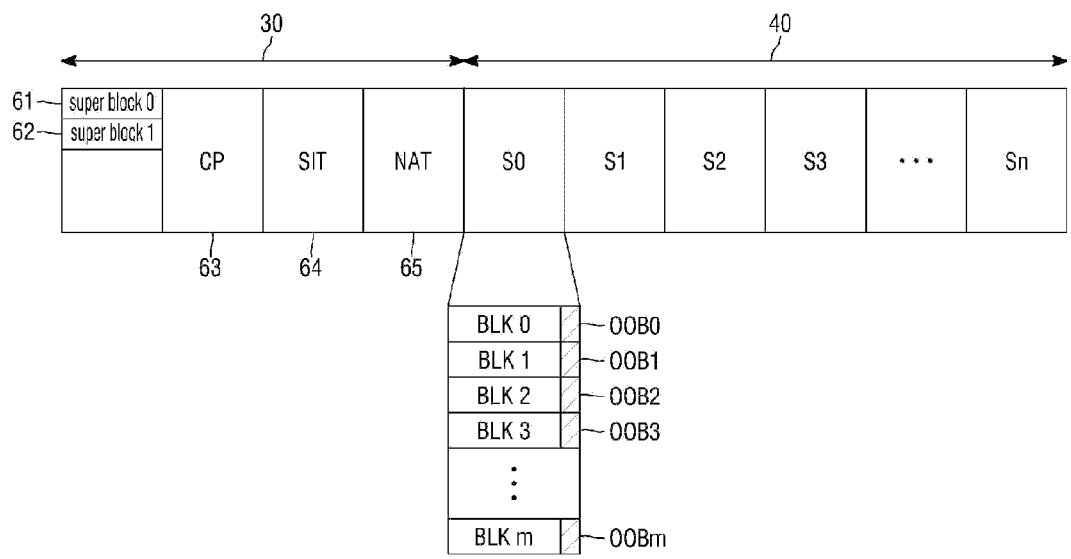

The F2FS file system can also configure the storage area of storage device 20 as shown in FIG. 10D. Referring to FIG. 10D, as in FIG. 10C, first area 30 does not include SSA 66 (see FIG. 10A). That is, first area 30 includes super blocks 61 and 62, CP area 62, SIT 64, and NAT 65. Therefore, the segment summary information may be stored in second area 40. Second area 40 includes a plurality of segments S0 through Sn. Each of the segments S0 through Sn is divided into a plurality of blocks BLK0 through BLKm, and the blocks BLK0 through BLKm respectively include out of band (OOB) areas OOB1 through OOBm, where m is a natural number. The segment summary information may be stored in the OOB areas OOB1 through OOBm.

Figure 13:
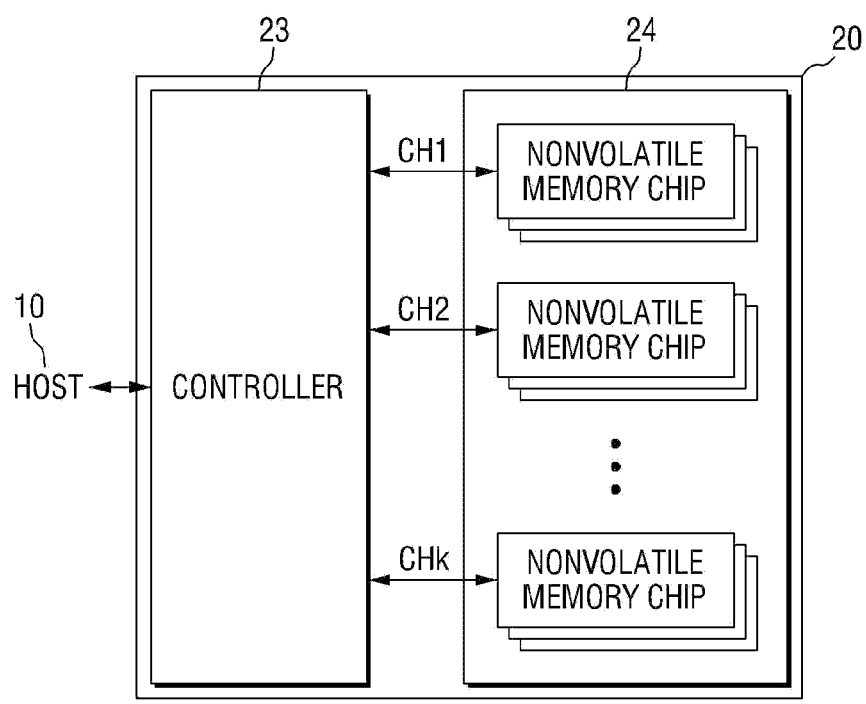
Figure 14:
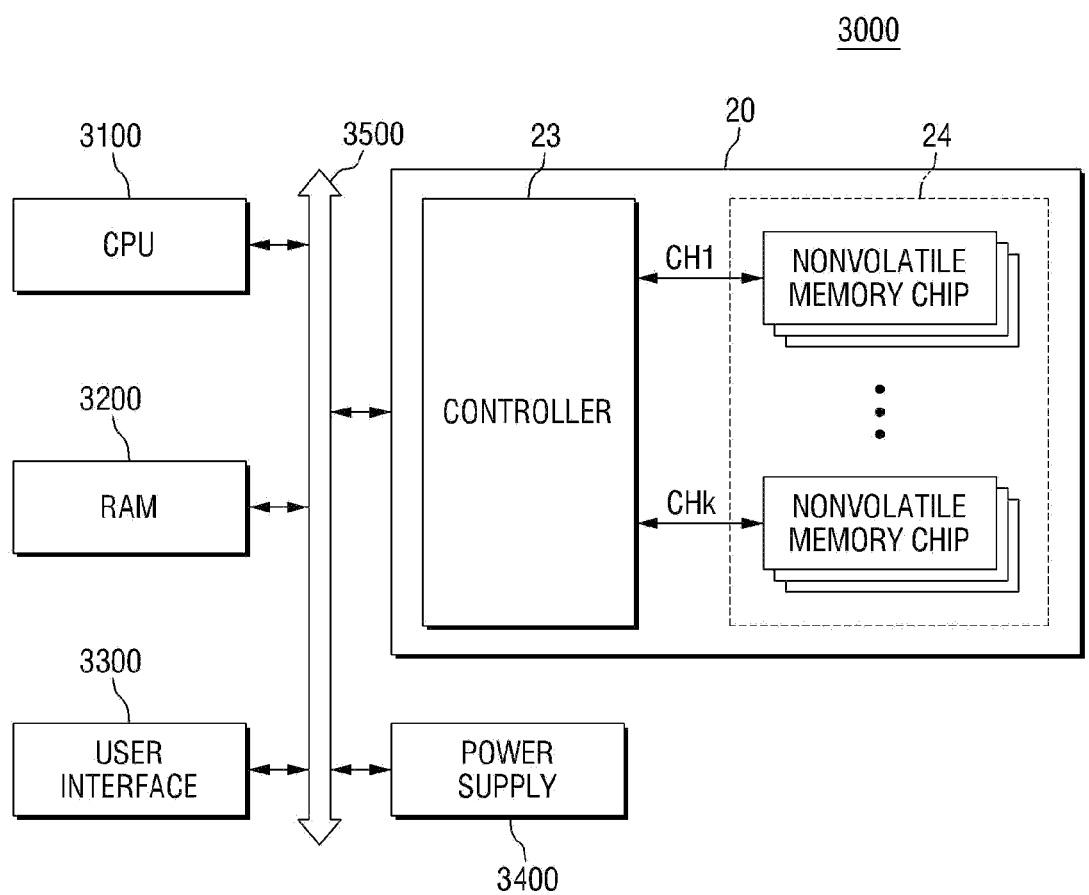

FIGS. 12 through 14 are block diagrams of other specific examples of the computing system according to some embodiments of the present invention.

Referring to FIG. 12, storage device 20 may include a nonvolatile memory device 22 and a controller 21.

Nonvolatile memory device 22 includes a plurality of nonvolatile memory cells or elements, and is controlled by controller 21 to read or write data from or to the nonvolatile memory elements or cells. A storage area of nonvolatile memory device 22 consists of first area 30 which is written in a random access manner and second area 40 to which a plurality of segments, each including a plurality of blocks, are written in a sequential access manner. Second area 40 consists of a log area in which the segments are stored and a free area in which segments can be stored. Metadata about data stored in second area 40 is stored in first area 30. The metadata includes a bitmap indicating whether each block is a live block. Bitmap is data that is referred to in a segment cleaning process in order to discover live blocks in each victim segment.

Super blocks 61 and 62, CP area 63, SIT 64, and NAT 65 described above may be stored as the metadata in first area 30 of nonvolatile memory device 22. Bitmap is included in SIT 64.

Each bit of bitmap corresponds to one block.

Controller 21 is connected to host 10 and nonvolatile memory device 22. Controller 21 is configured to access nonvolatile memory device 22 in response to a request from host 10. For example, controller 21 may be configured to control read, write, erase and background operations of nonvolatile memory device 22. Controller 21 may be configured to provide an interface between nonvolatile memory device 22 and host 10. Controller 21 may be configured to drive firmware for controlling nonvolatile memory device 22.

During the segment cleaning process, controller 21 is controlled by host 10 to write back a clean segment composed of the live blocks to the free area located at the end of the log area and update bitmap accordingly. Here, of the bits included in the bitmap, bits corresponding to live blocks in the victim segments may be set to a value indicating an invalid block (e.g., a 0), and bits corresponding to live blocks in the clean segment may be set to a value indicating a live block (e.g., a 1).

Controller 21 further includes well-known components such as a random access memory (RAM), a processing unit, a host interface, and a memory interface. The RAM is used as at least one of an operation memory of the processing unit, a cache memory between nonvolatile memory device 22 and host 10, and a buffer memory between nonvolatile memory device 22 and host 10. The processing unit controls the overall operation of controller 21.

Controller 21 may include a buffer 210. Buffer 210 may be a RAM, in particular, a DRAM.

Controller 21 and nonvolatile memory device 22 may be integrated into one semiconductor device. Specifically, controller 21 and nonvolatile memory device 22 may be integrated into one semiconductor device to form a memory card. For example, controller 21 and nonvolatile memory device 22 may be integrated into one semiconductor device to form a personal computer (PC) card (e.g., Personal Computer Memory Card International Association (PCM-CIA)), a compact flash card (CF), a smart media card (SM, SMC), a memory stick, a multimedia card (e.g., MMC, RS-MMC, MMCmicro), a SD card (e.g., SD, miniSD, microSD, SDHC), or a universal flash storage (UFS). In some embodiments, controller 21 and nonvolatile memory device may be integrated into one semiconductor device to form a universal serial bus (USB) flash drive.

Alternatively, controller 21 and nonvolatile memory device 22 may be integrated into one semiconductor device to form a solid state drive (SSD). The SSD includes a storage device which stores data in a semiconductor memory. When the SSD is connected to host 10, the operation speed of host 10 may increase significantly compared, for example, to other types of storage devices such an optical disk drive, a hard disk drive, etc.

Nonvolatile memory device 22 or storage device 20 may be mounted using various forms of packages. Nonvolatile memory device 22 or storage device 20 may be mounted using packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), thin quad flat pack (TQFP), system in package (SIP), multi chip package (MCP), wafer-level fabricated package (WFP), and wafer-level processed stack package (WSP).

Referring to FIG. 13, storage device 20 includes a nonvolatile memory device 24 and a controller 23. Nonvolatile memory device 24 includes a plurality of nonvolatile memory chips, each of which includes a plurality of nonvolatile memory elements or cells. The nonvolatile memory chips form multiple memory chip groups. Each of the memory chip groups has one common channel for communication with controller 23. For example, the nonvolatile memory chips may communicate with controller 23 through first through $k^{th}$ channels CH1 through CHk.

In FIG. 13, a plurality of nonvolatile memory chips are connected to one channel. However, storage device 20 can be modified such that one nonvolatile memory chip is connected to one channel.

Referring to FIG. 14, a system 3000 includes a central processing unit (CPU) 3100, a RAM 3200, a user interface 3300, a power supply 3400, and storage device 20 of FIG. 12.

In system 3000 CPU 3100, RAM 3200, user interface 3300, and power supply 3400 are connected through a system bus 3500. Data provided through user interface 3300 or processed by CPU 3100 is stored in system 3000.

In FIG. 14, nonvolatile memory device 24 is connected to system bus 3500 through controller 23. However, nonvolatile memory device 24 can also be connected directly to system bus 3500.

A directory entry lookup method according to an embodiment of the present invention will now be described with reference to FIG. 15.

In the directory entry lookup method according to the current embodiment, directory entries stored in a storage device according to the indexing structure of FIG. 7 are looked up.

Figure 15:
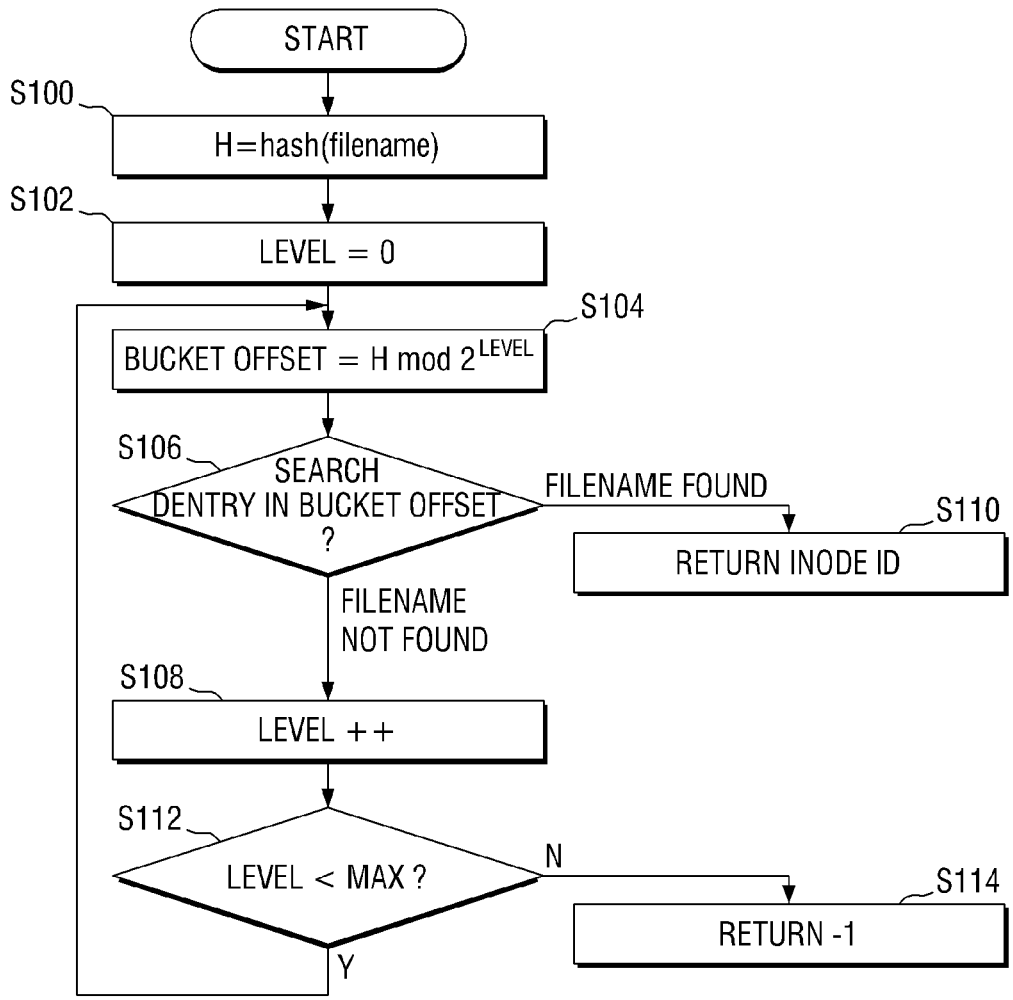
FIG. 15 is a flowchart illustrating a directory entry lookup method according to an embodiment of the present invention.

Referring to FIG. 15, a file lookup command, which specifies a target directory and a target filename, is received.

A hash value (H) is obtained by applying a hash function to the target filename (operation S100). The hash function may be one of known hash functions. A lookup level is initialized to zero (operation S102).

A bucket offset which reflects the hash value and the lookup level is calculated (operation S104).

A directory entry which includes the target filename is searched for in a bucket corresponding to the hash value from among buckets at the lookup level which are included in a multi-level hash table (stored in the storage device) of the target directory (operation S106).

If the directory entry which includes the target filename is found, an inode ID included in the found directory entry is returned (operation S110). On the other hand, if the directory entry which includes the target filename is not found, the lookup level is increased (operation S108). Then, operations S104 and S106 are performed again at the increased lookup level. If the directory entry which includes the target filename is not found even at a last lookup level (operation S112), a lookup failure code (e.g., −1) is returned (operation S114).

A non-transitory, or tangible, computer-readable data storage medium (e.g., one or more memory devices, a hard disk, an optical disk etc.) according to an embodiment disclosed herein may record a program for executing a directory entry lookup method as disclosed herein. The program may be a file system module used as part of an operating system. The program may be installed in a host.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A host, comprising:
an interface configured to exchange data with a storage device which stores a multi-level hash table comprising directory entries of each directory of files stored in the storage device; and
a file system module configured to receive a file lookup command designating a target directory and a target filename, to calculate a hash value which reflects the target filename and a lookup level, and to search for a directory entry which comprises the target filename in a bucket corresponding to the hash value from among buckets at the lookup level which are included in a multi-level hash table of the target directory,
wherein when the searching for the directory entry at the lookup level fails, the file system module increases the lookup level and performs again the calculating of the hash value based on the increased lookup value and the searching for the directory entry which comprises the target filename.

2. The host of claim 1, wherein the multi-level hash table does not comprise data other than the directory entries.

3. The host of claim 1, wherein buckets at each level of the multi-level hash table are accessed using a zero-base offset, and the hash value is used as a bucket offset.

4. The host of claim 1, wherein each bucket included in the multi-level hash table comprises N blocks, and each block has a predetermined data size, where N is a natural number equal to or greater than two.

5. The host of claim 4, wherein each block comprises a predetermined number of directory entry slots, and one or more directory entry slots form one directory entry.

6. The host of claim 5, wherein each of the directory entry slots comprises a file index node (inode) ID storage area and a filename storage area of a predetermined size, wherein if two or more directory entry slots form one directory entry, character strings stored in the filename storage areas included in the directory entry slots of the directory entry are connected together to form a filename of a file corresponding to the directory entry.

7. The host of claim 1, wherein the number of buckets at each level of the multi-level hash table increases as the level increases.

8. The host of claim 7, wherein the number of buckets at each level of the multi-level hash table is $M^L$, where M is a predetermined base and a natural number equal to or greater than two, and where L is a number indicating the level.

9. The host of claim 8, wherein the hash value is obtained by dividing a value, which is obtained by applying a hash function to the target filename, by the number of buckets at the lookup level.

10. The host of claim 7, wherein the multi-level hash table is stored according to an indexing structure of a tree structure which uses an index node (inode) of a directory corresponding to the multi-level hash table as a root.

11. The host of claim 10, wherein the inode comprises at least one of: pointers indicating data blocks, pointers indicating direct node blocks, pointers indicating first indirect node blocks, and pointers indicating second indirect node blocks, wherein each of the direct node blocks comprises one or more pointers indicating the data blocks, each of the first indirect node blocks comprises one or more pointers indicating the direct node blocks, each of the second indirect node blocks comprises one or more pointers indicating the first indirect node blocks, and directory entries of the directory corresponding to the multi-level hash table are stored only in the data blocks.

12. The host of claim 7, wherein the multi-level hash table is stored in the storage device according to an indexing structure which is identical to an indexing structure used by the storage device to store data included in a file.

13. A directory entry lookup method comprising:
providing a storage device which stores a multi-level hash table comprising directory entries of each directory of files stored in the storage device;
receiving a file lookup command designating a target directory and a target filename;
calculating a hash value which reflects the target filename and a lookup level and searching for a directory entry which comprises the target filename in a bucket corresponding to the hash value from among buckets at the lookup level which are included in a multi-level hash table of the target directory which is stored in the storage device; and
when the searching for the directory entry fails, increasing the lookup level and performing again the calculating of the hash value based on the increased lookup value and the searching for the directory entry which comprises the target filename.

14. The method of claim 13, further comprising outputting an inode ID included in the found directory entry to a module which sent the file lookup command.

15. The method of claim 13, wherein the calculating of the hash value and the searching of the directory entry which comprises the target filename comprises initializing the lookup level to zero when initially searching for the directory entry which comprises the target filename after receiving the file lookup command.

16. A storage device, comprising:
a nonvolatile memory device; and
a controller for accessing the plurality of memory elements for storing data therein and reading data therefrom,
wherein the nonvolatile memory device is configured to store therein a plurality of files of a directory according to a file indexing structure, and is further configured to store therein a plurality of directory entries for the files of the directory, the directory entries being stored according to a directory entry indexing structure,
wherein the directory entry indexing structure is configured as a multi-level hash table comprising a plurality of levels each having one or more buckets, each bucket further including a plurality of data blocks, each data block in turn having a plurality of directory entry slots,
wherein a number of the buckets each level has increases as the level increases,
wherein each of the directory entries is stored in one or more of the directory entry slots, and
wherein one of the buckets at a particular level in which a one of the directory entries for a particular one of the files is stored is obtained by applying a hash function to a filename of the particular file and dividing a result of the hash function by the number of the buckets that the particular level has.

17. The storage device of claim 16, wherein the controller includes a buffer comprising volatile memory, wherein the nonvolatile memory device includes a random access area and a sequential area, and wherein the controller is configured to exchange the data between a host and the random access area of the nonvolatile memory device via the buffer.

18. The storage device of claim 16, wherein the number of buckets at each level A included in the multi-level hash table is MA, where M is a natural number equal to or greater than two.

19. The storage device of claim 16, wherein the multi-level hash table has a tree structure, wherein the tree structure includes:
an index node (inode) as a root of the tree structure, the inode being stored in an inode block;
one or more direct nodes, each direct node being stored in a corresponding direct node block, and
one or more first indirect nodes, each first indirect node being stored in a corresponding first indirect node block,
wherein each direct node includes one or more pointers to one or more of the data blocks,
wherein each first indirect nodes includes at least one pointer to one of the direct node blocks, and
wherein the inode includes at least one of: pointers to one or more of the data blocks, pointers to one or more of the direct node blocks, and pointers to one or more of the first indirect node blocks.

20. The storage device of claim 16, wherein each of the nodes has a corresponding node ID, and wherein the nonvolatile memory device is configured to store therein a node address table which maps the node IDs to physical addresses of the nonvolatile memory device.

* * * * *